United States Patent
Fukazawa

(10) Patent No.: US 9,731,977 B2
(45) Date of Patent: Aug. 15, 2017

(54) METHOD FOR PRODUCING α-LITHIUM ALUMINATE

(71) Applicant: NIPPON CHEMICAL INDUSTRIAL CO., LTD., Tokyo (JP)

(72) Inventor: Junya Fukazawa, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 15/114,594

(22) PCT Filed: Feb. 5, 2014

(86) PCT No.: PCT/JP2014/052650
§ 371 (c)(1),
(2) Date: Jul. 27, 2016

(87) PCT Pub. No.: WO2015/114840
PCT Pub. Date: Aug. 6, 2015

(65) Prior Publication Data
US 2016/0347623 A1 Dec. 1, 2016

(30) Foreign Application Priority Data
Jan. 28, 2014 (JP) ................................. 2014-013268

(51) Int. Cl.
*C01F 7/04* (2006.01)
*H01M 8/14* (2006.01)
*H01M 8/0295* (2016.01)

(52) U.S. Cl.
CPC ........... *C01F 7/043* (2013.01); *H01M 8/0295* (2013.01); *H01M 8/142* (2013.01); *C01P 2002/72* (2013.01); *C01P 2004/03* (2013.01); *C01P 2006/12* (2013.01); *C01P 2006/37* (2013.01); *C01P 2006/40* (2013.01); *H01M 2008/147* (2013.01); *Y02E 60/526* (2013.01)

(58) Field of Classification Search
CPC ..................................................... C01F 7/043
See application file for complete search history.

(56) References Cited

U.S. PATENT DOCUMENTS 6,340,454 B1  1/2002  Nakaoka et al.

FOREIGN PATENT DOCUMENTS

| JP | 2-80319 A | 3/1990 |
|----|-----------|--------|
| JP | 2-243511 A | 9/1990 |
| JP | 9-110421 A | 4/1997 |
| JP | 9-110422 A | 4/1997 |
| JP | 10-112329 A | 4/1998 |
| JP | 2000-195531 A | 7/2000 |
| JP | 2004-149360 A | 5/2004 |
| JP | 2007-320837 A | 12/2007 |

OTHER PUBLICATIONS

International Search Report dated Mar. 4, 2014, issued in counterpart International Application No. PCT/JP2014/052650 (2 pages).

*Primary Examiner* — Matthew E Hoban
*Assistant Examiner* — James Fiorito
(74) *Attorney, Agent, or Firm* — Westerman, Hattori, Daniels & Adrian, LLP

(57) ABSTRACT

The purpose of the present invention is to provide an industrially advantageous method for producing α-lithium aluminate which has physical properties that are suitable for use as an electrolyte holding plate of a MCFC having excellent thermal stability, even if the α-lithium aluminate is a fine material having a BET specific surface area of 10 m$^2$/g or higher in particular. Provided is a method for producing α-lithium aluminate characterized by subjecting a mixture (a), which is obtained by mixing transitional alumina and lithium carbonate at an Al/Li molar ratio of 0.95-1.01, to a first firing reaction so as to obtain a fired product, and subjecting a mixture (b), which is obtained by adding an aluminum compound to the obtained fired product at quantities whereby the molar ratio of aluminum atoms in the aluminum compound relative to lithium atoms in the fired product (Al/Li) is 0.001-0.05, to a second firing reaction.

8 Claims, 3 Drawing Sheets

[Fig. 1]
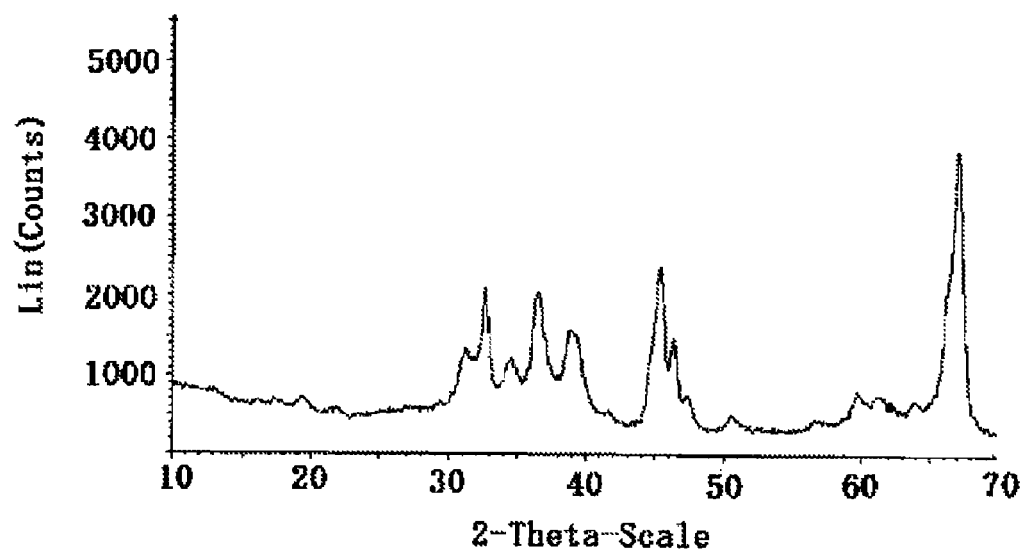
[Fig. 2]
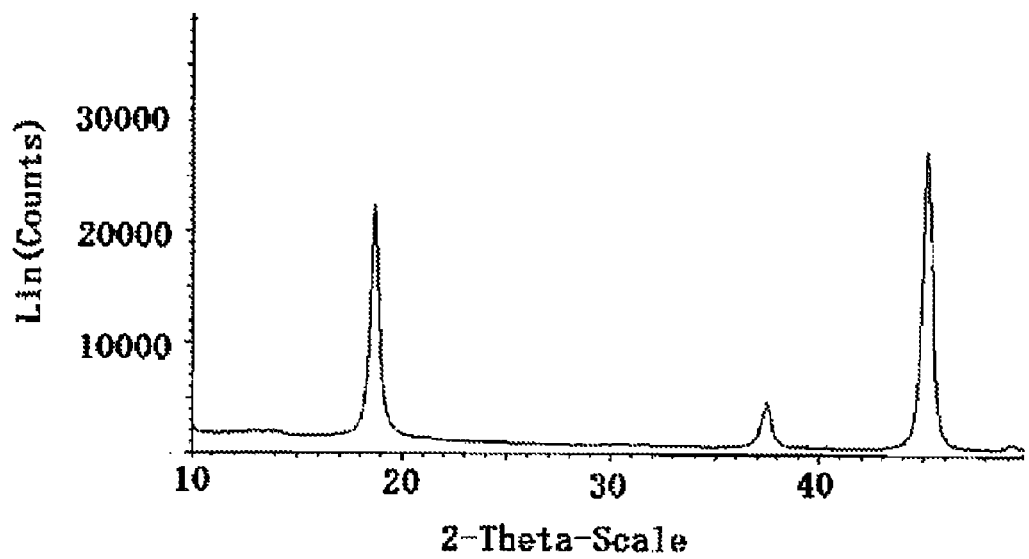

[Fig. 3]
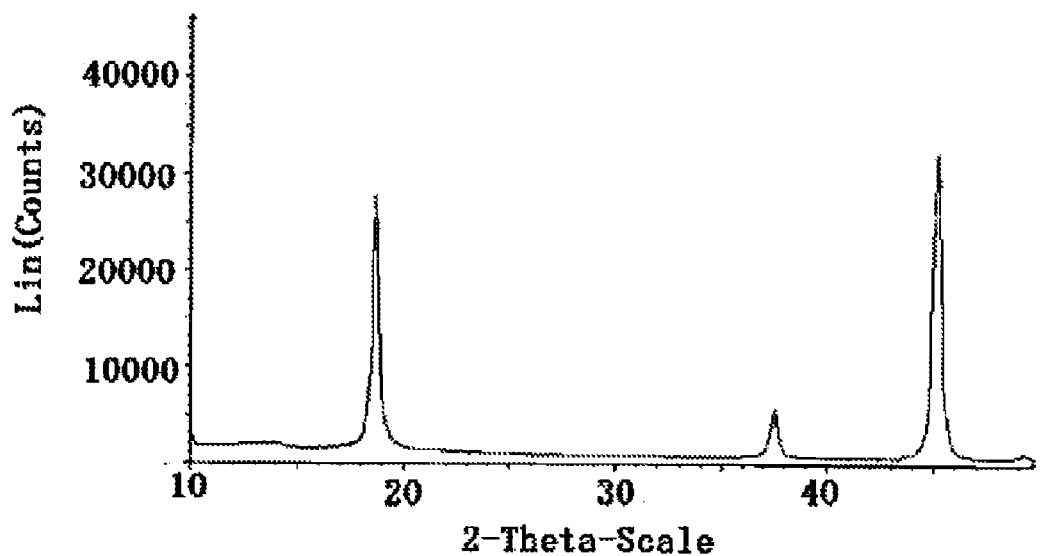
[Fig. 4]
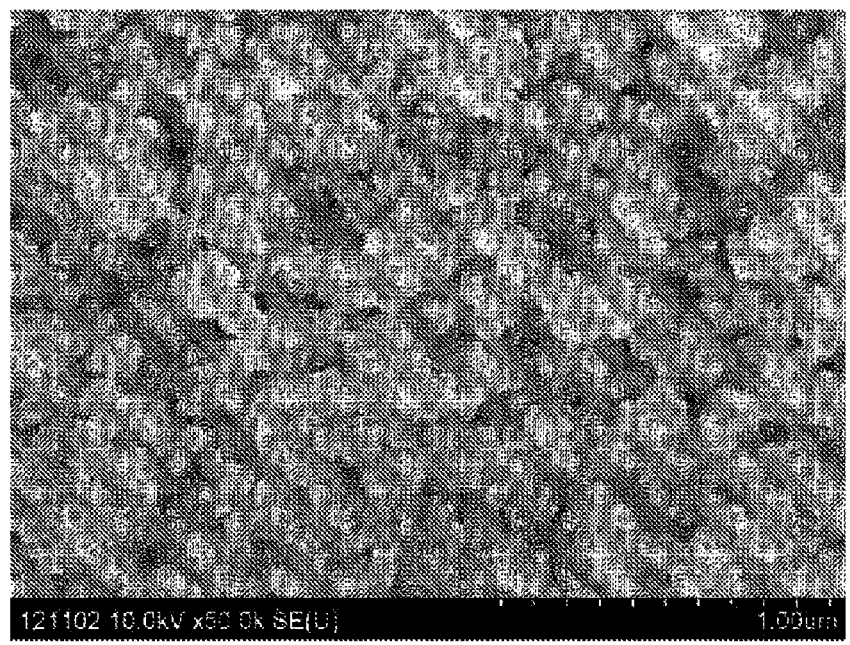

[Fig. 5]
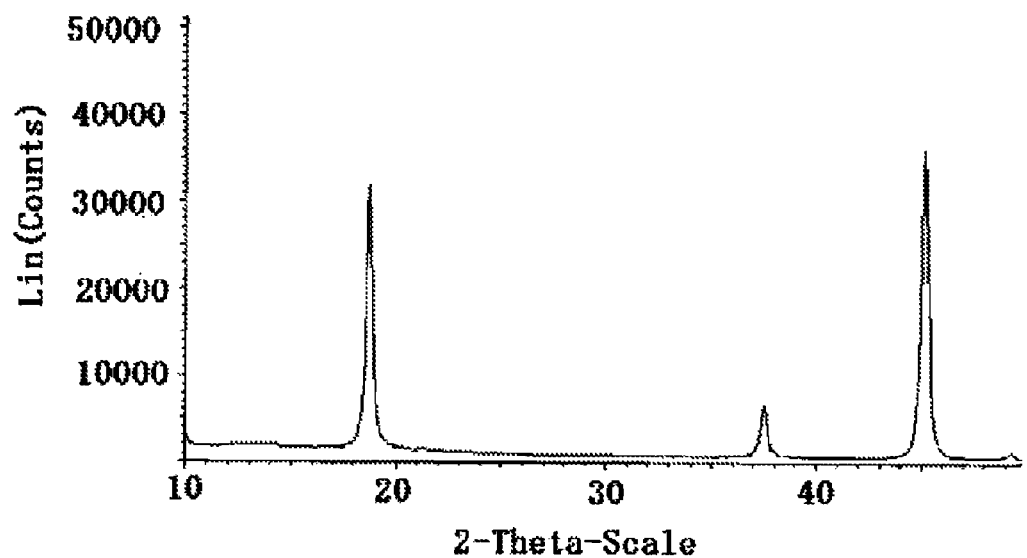
[Fig. 6]
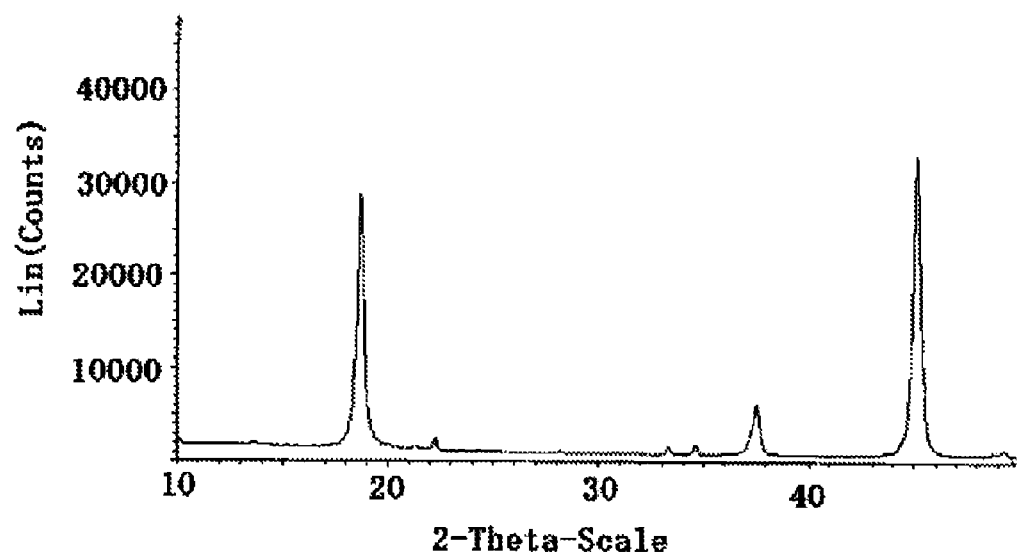

US 9,731,977 B2

METHOD FOR PRODUCING α-LITHIUM ALUMINATE

TECHNICAL FIELD

The present invention relates particularly to α-lithium aluminate ($LiAlO_2$) useful for an electrolyte matrix of a molten carbonate fuel cell (MCFC), and a method for producing the same.

BACKGROUND ART

Electrolyte matrices for MCFCs are used for the purpose of supporting a mixed molten carbonate salt of lithium carbonate ($Li_2CO_3$), potassium carbonate ($K_2CO_3$), sodium carbonate ($Na_2CO_3$) and the like in a high-temperature region around 650° C. Hence, the electrolyte matrices require properties including a high property of supporting the molten carbonate salt, as well as particle shape stability, alkali resistance and heat resistance. As a constituent material meeting such required properties of the electrolyte matrices, lithium aluminate has been used; particularly, a fine γ-lithium aluminate has been suitably used which is excellent in the electrolyte supporting capacity and relatively large in the specific surface area.

Further, it is known that a fine α-lithium aluminate also is useful as electrolyte matrices for MCFCs. Patent Literature 1 discloses a method for producing a high-crystalline α-lithium aluminate. Further, Patent Literature 2 discloses a method of subjecting an alumina powder having a specific surface area of 100 $m^2/g$ or larger and a mixture of carbonate salts including lithium carbonate to heat treatment in a molten carbonate salt at 700 to 800° C. Further, Patent Literature 3 discloses a method of subjecting an aluminum hydroxide powder having a specific surface area of 100 $m^2/g$ or larger and a mixture of carbonate salts including lithium carbonate to heat treatment in a molten carbonate salt at 700 to 800° C.

In any of the above methods, alumina or lithium aluminate as a raw material is heat-treated in a molten carbonate salt. Such methods not only need to take as long a reaction time as 50 hours to 100 hours, but due to the character of the production methods, further need to inevitably comprise a step of cleaning and drying products in order to remove the carbonate salts, which cannot avoid the complexity and the high cost of the steps.

Further, Patent Literature 4 proposes to produce α-lithium aluminate by dry mixing and firing a porous γ-alumina and a lithium compound in an approximately stoichiometric molar ratio of Li/Al. In the case where a fine α-lithium aluminate having a BET specific surface area of 10 $m^2/g$ or larger is produced by this production method, however, there is hardly provided α-lithium aluminate having thermal stability necessary for electrolyte matrices for MCFCs.

CITATION LIST

Patent Literature

Patent Literature 1: Japanese Patent Laid-open Ho. 2-80319
Patent Literature 2: Japanese Patent Laid-Open No. 2-243511
Patent Literature 3: Japanese Patent Laid-open No. 10-112329
Patent Literature 4: Japanese Patent Laid-Open No. 2000-195531

SUMMARY OF INVENTION

Technical Problem

Under such background, there has been demanded the development of α-lithium aluminate which particularly has a BET specific surface area of 10 $m^2/g$ or larger, and is excellent in the supporting property and heat resistance meeting the purpose of improving the life elongation of MCFCs.

As a result of exhaustive studies to solve the above problematic point, the present inventors have found that a transition alumina is used; the transition alumina and lithium carbonate are mixed in a molar ratio of Al/Li of about 1; the obtained mixture (a) is subjected to a first firing reaction; then, a mixture (b) obtained by adding an aluminum compound in a specific range of the molar ratio (Al/Li) of Al atoms in the aluminum compound to Li atoms in the obtained fired product to the obtained fired product is subjected to a second firing reaction to thereby produce α-lithium aluminate, which, even in the case of a fine product having a BET specific surface area of 10 $m^2/g$ or larger, is excellent in thermal stability and has various physical properties suitable as an electrolyte matrix for MCFCs. This finding has led to the completion of the present invention.

The present invention has been completed based on the above finding, and the subject to be attained for the object of the present invention is to provide α-lithium aluminate by an industrially advantageous method, which, particularly even in the case of a fine product having a BET specific surface area of 10 $m^2/g$ or larger, is excellent in thermal stability in a molten carbonate salt of MCFC and has various physical properties suitable as an electrolyte matrix for MCFCs.

Solution To Problem

More specifically, the present invention provides a method for producing α-lithium aluminate comprising mixing a transition alumina and lithium carbonate in a molar ratio of Al/Li of 0.95 to 1.01, subjecting the obtained mixture (a) to a first firing reaction to thereby obtain a fired product, and then, subjecting a mixture (b) obtained by adding an aluminum compound in a molar ratio (Al/Li) of Al atoms in the aluminum compound to Li atoms in the obtained fired product of 0.001 to 0.05 to the obtained fired product, to a second firing reaction.

Further, the present invention provides a method for producing α-lithium aluminate, wherein in the first firing reaction, the firing temperature is 650 to 850° C.

Further, the present invention provides a method for producing α-lithium aluminate, wherein in the second firing reaction, the firing temperature is 750 to 900° C.

Further, the present invention provides a method for producing α-lithium aluminate, wherein the transition alumina is a transition alumina containing a θ phase or γ-alumina.

Further, the present invention provides a method for producing α-lithium aluminate, wherein the transition alumina is θ-alumina.

Further, the present invention provides a method for producing α-lithium aluminate, wherein the BET specific surface area of the transition alumina is 50 $m^2/g$ or larger.

Further, the present invention provides a method for producing α-lithium aluminate, wherein the aluminum compound is a transition alumina.

Further, the present invention provides a method for producing α-lithium aluminate to be used as an electrolyte matrix for a molten carbonate fuel cell.

Advantageous Effects of Invention

The present invention, since being constituted as described above, can provide α-lithium aluminate by an industrially advantageous method, which, particularly even in the case of a fine product having a BET specific surface area of 10 m$^2$/g or larger, is excellent in thermal stability and has various physical properties suitable as an electrolyte matrix for MCFCs.

BRIEF DESCRIPTION OF DRAWINGS

FIG. 1 is an X-ray diffraction diagram of θ-alumina used in Example 1.

FIG. 2 is an X-ray diffraction diagram of a fired product (α-lithium aluminate (1)) obtained after a first firing reaction in Example 1.

FIG. 3 is an X-ray diffraction diagram of α-lithium aluminate (2) obtained after the second firing reaction in Example 1.

FIG. 4 is a SEM photograph of α-lithium aluminate (2) obtained after a second firing reaction in Example 1.

FIG. 5 is an X-ray diffraction diagram after a thermal stability test of α-lithium aluminate (2) obtained in Example 1.

FIG. 6 is an X-ray diffraction diagram after a thermal stability test of α-lithium aluminate obtained in Comparative Example 2.

DESCRIPTION OF EMBODIMENTS

Hereinafter, the present invention will be described based on preferred embodiments.

α-lithium aluminate (hereinafter, referred to as "α-lithium aluminate (2)" in some cases) obtained in the present production method is α-lithium aluminate (2) containing substantially no γ-lithium aluminate and being of a single phase in X-ray diffraction analysis.

Further, the α-lithium aluminate (2) obtained in the present production method is α-lithium aluminate (2) containing substantially no γ-lithium aluminate in X-ray diffraction analysis and being excellent in thermal stability even after a sample of the α-lithium aluminate (2) is heated in an air atmosphere at 750° C. for 200 hours.

Further, the BET specific surface area of the α-lithium aluminate (2) obtained in the present production method is not especially limited, but in consideration of the advantageous effect of the α-lithium aluminate (2) obtained in the present production method, the BET specific surface area is 10 m$^2$/g or larger, and preferably 10 to 40 m$^2$/g.

The method for producing the α-lithium aluminate (2) relevant to the present invention comprises mixing a transition alumina and lithium carbonate in a molar ratio of Al/Li of about 1, subjecting the obtained mixture (a) to a first firing reaction to thereby obtain a fired product (hereinafter, referred to as "α-lithium aluminate (1)" in some cases), and then, subjecting a mixture (b) obtained by adding an aluminum compound in a molar ratio (Al/Li) of Al atoms in the aluminum compound to Li atoms in the obtained fired product of 0.001 to 0.05 to the obtained fired product, to a second firing reaction; and the present production method basically comprises the following steps of (a) to (d):

(a): a mixture (a) preparation step;
(b): a first firing reaction step;
(c): a mixture (b) preparation step; and
(d): a second firing reaction step.

(a): The Mixture (a) Preparation Step

The mixture (a) preparation step is a step of preparing a homogeneous mixture (a) in which a transition alumina and lithium carbonate are mixed in a molar ratio of Al/Li of about 1 ranging from 0.95 to 1.01.

Alumina includes various types of crystal forms of γ, δ, θ, α and the like; aluminas of crystal forms of γ, δ and θ other than α are low-temperature phases of α-alumina, and called transition aluminas; for example, boehmite represented by the structural formula: 4[AlO(OH)], when being heated, so transforms its phase that a boehmite phase→a γ phase→a δ phase→a θ phase→an α phase, and transition aluminas of mixed phases, such as of a δ phase and a θ phase, and a θ phase and an α phase, are also known.

The transition alumina to be used in the present production method, may be any of crystal forms of γ, δ and θ, and may further be of a single phase of γ, δ or θ, or a mixed phase of these crystal forms; but in the present invention, a transition alumina containing a γ or θ phase is preferable, and particularly when a transition alumina containing a θ phase is used, it is preferable from the viewpoint that α-lithium aluminate further improved in chemical stability can be provided.

As a transition alumina containing a θ phase, there are used one containing a θ phase, one containing a mixed phase of a δ phase and a θ phase, and one containing a mixed phase of a γ phase, a δ phase and a θ phase; among these, θ alumina of a θ phase is preferably used also from the viewpoint of providing α-lithium aluminate excellent particularly in thermal stability and more improved in chemical stability and further having a BET specific surface area of 10 m$^2$/g or larger, preferably 10 to 40 m$^2$/g. Here, the transition alumina of the mixed phase can be checked for whether the transition alumina is of a mixed phase by X-ray diffraction analysis (for example, see Japanese Patent Laid-Open No. 07-96186).

With respect to the preferred physical properties of the transition alumina relevant to the mixture (a) preparation step, from the viewpoint of producing the α-lithium aluminate (2) having a BET specific surface area of 10 m$^2$/g or larger, preferably 10 to 40 m$^2$/g, the transition alumina has a BET specific surface area of 50 m$^2$/g or larger, and preferably 60 to 200 m$^2$/g.

The production method itself of such transition alumina is well-known; for example, a transition alumina containing a θ phase can be obtained by subjecting γ-alumina to a heat treatment at 800 to 1,100° C., preferably 900 to 1,050° C. Further, as the transition alumina to be used in the present invention, commercially available ones can suitably be used.

The lithium carbonate relevant to the mixture (a) preparation step is not especially limited in the physical properties and the like as long as being industrially available, but from the viewpoint of making good the reactivity with the transition alumina, there is preferably used lithium carbonate having an average particle size of 15 μm or smaller, preferably 10 μm or smaller, as determined by the laser method.

In the mixture (a) preparation step, the transition alumina and the lithium carbonate, in order to obtain the α-lithium aluminate (1), are mixed in a molar ratio of Al/Li of 0.95 to 1.01, preferably 0.97 to 1.00.

The reason therefor is because when the molar ratio of Al/Li is out of the above range, a single-phase α-lithium aluminate (1) having the target composition is hardly obtained as observed by X-ray diffractometry, and it also becomes difficult to provide α-lithium aluminate (2), excellent in thermal stability through the subsequent steps.

A mixing method of the transition alumina and the lithium carbonate relevant to the mixture (a) preparation step may be of a dry type or a wet type, and is not especially limited.

In the case of dry mixing, when mutual dispersion among the powders is insufficient, in the first firing reaction step of (b), the α-lithium aluminate (1) particles partially aggregate and changes into coarse particles. Hence, in order to obtain the state of raw materials being homogeneously mixed and dispersed, it is preferable that the process is carried out using a high-speed dispersion and mixing machine, for example, a Henschel Mixer or a Super Mixer.

In the case of wet mixing, when a slurry is filtered, lithium carbonate dissolved in water is transferred into the filtrate, and thus it becomes difficult to obtain the α-lithium aluminate (1) as the target composition. Hence, it is preferable that the slurry containing raw materials blended in approximately stoichiometric equivalent ratios is dried as the whole amount by a spray drier.

(b): The First Firing Reaction Step

The mixture (a) obtained in the mixture (a) preparation step of the above (a) is subjected to the first firing reaction step of (b) to thereby obtain a fired product.

The fired product obtained by the first firing reaction is α-lithium aluminate (1). This α-lithium aluminate (1) itself obtained by the first firing reaction is inferior in thermal stability particularly when the BET specific surface area is 10 m$^2$/g or larger, preferably 10 to 40 m$^2$/g, to α-lithium aluminate (2) having been subjected to the second firing reaction as described later. In the present production method, however, by subjecting the fired product (α-lithium aluminate (1)) obtained by the first firing reaction to the second firing reaction step of the mixture (b) preparation step of (c) and the second firing reaction step of (d) as described later, the α-lithium aluminate (1) can be converted to α-lithium aluminate (2) excellent in thermal stability.

In the first firing reaction step, it is important from the viewpoint of providing α-lithium aluminate (2) excellent in thermal stability particularly to obtain a single-phase α-lithium aluminate (1) in X-ray diffraction analysis of the fired product.

The firing temperature relevant to the first firing reaction step is 650 to 850° C., and preferably 700 to 800° C. The reason therefor is because a firing temperature of the first firing reaction of lower than 650° C. hardly gives a single-phase lithium aluminate (1); and on the other hand, a firing temperature of the first-firing reaction of higher than 800° C. is likely to make lithium aluminate (1) having an α phase and a γ phase mixedly present, which are unpreferable.

Here, with respect to the relationship between the firing temperature and the firing time, even if the same raw material mixture is reacted at the same temperature, different crystal forms of lithium aluminate (1) may be obtained depending on the firing time. Generally, firing for a longer time is more liable to partially form a γ form other than α form. Further, with respect to this tendency, a higher firing temperature is likely to produce the γ form in a shorter time. Hence, it is preferable to carry out the firing while whether or not a single-phase α-lithium aluminate (1) is obtained is checked by suitably carrying out the X-ray diffraction analysis. Carrying out the firing for 0.5 to 40 hours at the above-mentioned firing temperature can usually produce the single-phase α-lithium aluminate (1) as the fired product.

The firing atmosphere is not especially limited, and may be any of in an inert gas atmosphere, in a vacuum atmosphere, in an oxidative gas atmosphere and in the air.

The first firing reaction, as desired, may be carried out any number of times. After the completion of the first firing reaction, the obtained fired product, as required, may further be crushed and/or disintegrated.

(c): The Mixture (b) Preparation Step

The fired product obtained by the first firing reaction step of the above (b) is subjected to the mixture (b) preparation step of (c) to thereby obtain a mixture (b) in which the fired product and an aluminum compound are homogeneously mixed.

Examples of the aluminum compound relevant to the mixture (b) preparation step include transition aluminas of γ-alumina, δ-alumina and θ-alumina, transition aluminas of a mixed phase containing two or more of a γ phase, a δ phase, a θ phase and an α phase, aluminum hydroxide, aluminum dawsonite, and alum; among these, the transition alumina exemplified in the mixture (a) preparation step of the above-mentioned (a) can preferably be used. Here, in the case of using a transition alumina, the type of the transition alumina is not especially limited, and may be the same as used in the above-mentioned mixture (a) preparation step or may be different therefrom.

Further, the aluminum compound relevant to the mixture (a) preparation step is especially preferably θ-alumina from the viewpoint of providing α-lithium aluminate having a BET specific surface area of 10 m$^2$/g or larger, preferably 10 to 40 m$^2$/g, and being excellent in thermal stability and chemical stability.

Further, the aluminum compound can be added to the fired product in the form of a powder, a solution or a slurry in which the aluminum compound is dispersed in a water medium.

In the mixture (b) preparation step, the loading of the aluminum compound is 0.001 to 0.05 in a molar ratio (Al/Li) of Al atoms in the aluminum compound to Li atoms in the fired product, and preferably 0.002 to 0.02, which are important for providing α-lithium aluminate (2) excellent in thermal stability. The reason is: when the loading of the aluminum compound is smaller than 0.001 in a molar ratio (Al/Li) of Al atoms in the aluminum compound to Li atoms in the fired product, the α-lithium aluminate (2) becomes one lacking thermal stability; on the other hand, when the loading is larger than 0.05 in a molar ratio of Al/Li, the α-lithium aluminate (2) becomes one containing unreacted substances, and thus both cases are unpreferable.

As mixing means of the fired product and the aluminum compound, a method can be used without no especial limitations as long as being capable of providing a mixture (b) in which the each raw material is homogeneously dispersed; and for example, there can be used the same method as in the mixture (a) preparation step of the above-mentioned (a). Specifically, there can be used a method of processing in a dry state using a high-speed dispersion and mixing machine, for example, a Henschel Mixer or a Super Mixer, and in the case of mixing in a wet state, a method in which a slurry is dried as the whole amount by a spray drier.

(d): The Second Firing Reaction Step

The mixture (b) obtained in the mixture (b) preparation step of the above (c) is subjected to the second firing reaction step to thereby obtain α-lithium aluminate (2) as a target of the present invention.

In the present production method, by carrying out the second firing reaction on the mixture (b) homogeneously mixed, there can be obtained the α-lithium aluminate (2) remarkably more improved in thermal stability than the fired product (α-lithium aluminate (1)) obtained by the first firing reaction.

In the second firing reaction step of the (d), it is important from the viewpoint of obtaining α-lithium aluminate (2) excellent in thermal stability particularly to obtain a single-phase α-lithium aluminate (2).

The firing temperature relevant to the second firing reaction step is 750 to 900° C., and preferably 770 to 830° C. The reason therefor is because a firing temperature of the second firing reaction of lower than 750° C. hardly gives a single-phase lithium aluminate (2) in the X-ray diffractometry; and on the other hand, a firing temperature of the second firing reaction of higher than 830° C. is likely to make a lithium aluminate (2) containing a γ phase, which are unpreferable.

Here, with respect to the relationship between the firing temperature and the firing time, even if the same raw material mixture is reacted at the same temperature, different crystal forms of lithium aluminate (2) may be obtained depending on the firing time. Generally, firing for a longer time is more liable to partially form a γ form other than α form. Further, with respect to this tendency, a higher firing temperature is likely to produce the γ form in a shorter time. Hence, it is preferable to carry out the firing while whether or not a single-phase α-lithium aluminate (2) is obtained is checked by suitably carrying out the X-ray diffraction analysis. Carrying out the firing for 0.5 to 40 hours at the above-mentioned firing temperature can usually produce α-lithium aluminate exhibiting satisfactory performance and being of a single phase.

The firing atmosphere is not especially limited, and may be any of in an inert gas atmosphere, in a vacuum atmosphere, in an oxidative gas atmosphere and in the air.

The second firing reaction, as desired, may be carried out any number of times. After the completion of the second firing reaction, the obtained fired product is, as required, crushed and/or disintegrated to thereby make a product.

The α-lithium aluminate (2) obtained by the production method according to the present invention is α-lithium aluminate (2) substantially containing no γ-lithium aluminate and in a single phase by X-ray diffraction, and even in the case of a product having a BET specific surface area of 10 m²/g or larger, is excellent in thermal stability. Hence, the α-lithium aluminate (2) obtained by the production method according to the present invention, even in the case of a product having a BET specific surface area of 10 m²/g or larger, can suitably be used as an electrolyte matrix for MCFCs.

EXAMPLES

Hereinafter, the present invention will be described specifically in comparison of Examples of the present invention with Comparative Examples. However, the scope of the present invention is not limited to these Examples.

Example 1

(a): A Mixture (a) Preparation Step

A commercially available θ-alumina (XRD in FIG. 1) having a BET specific surface area of 92 m²/g and an average particle size determined by the laser method of 30 μm, and a lithium carbonate having an average particle size determined by the laser method of 5 μm were weighed in such amounts that the molar ratio (Al/Li) became 1.00, and fully mixed by a Henschel Mixer to thereby prepare a homogeneous mixture (a).

(b): A First Firing Reaction Step

The homogeneous mixture (a) was charged in an alumina crucible, and subjected to a first firing reaction at 700° C. for 25 hours in the air atmosphere to thereby obtain a fired product. The obtained fired product was subjected to X-ray diffraction analysis, and was a single-phase α-lithium aluminate (1) (see FIG. 2).

(c): A Mixture (b) Preparation Step

The same θ-alumina as used in the mixture (a) preparation step was added to the fired product so that the molar ratio (Al/Li) to Li in the α-lithium aluminate (1) became 0.015, and thereafter fully mixed by a Henschel Mixer to thereby prepare a homogeneous mixture (b).

(d): A Second Firing Reaction Step

The homogeneous mixture (b) was charged in an alumina crucible, and subjected to a second firing reaction at 800° C. for 7 hours in the air atmosphere to thereby obtain α-lithium aluminate (2) sample. The obtained α-lithium aluminate (2) sample was subjected to X-ray diffraction analysis, and was α-lithium aluminate single phase (see FIG. 3), and had a BET specific surface area of 21.5 m²/g. A SEM photograph of the α-lithium aluminate (2) sample is shown in FIG. 4.

Example 2

(a): A mixture (a) Preparation Step

A commercially available γ-alumina having a BET specific surface area of 147 m²/g and an average particle size determined by the laser method of 30 μm, and a lithium carbonate having an average particle size determined by the laser method of 5 μm were weighed so that the molar ratio (Al/Li) became 1.00, and fully mixed by a Henschel Mixer to thereby prepare a homogeneous mixture (a).

(b): A First Firing Reaction Step

The homogeneous mixture (a) was charged in an alumina crucible, and subjected to a first firing reaction at 700° C. for 25 hours in the air atmosphere to thereby obtain a fired product. The obtained fired product was subjected to X-ray diffraction analysis, and was a single-phase α-lithium aluminate (1).

(c): A Mixture (b) Preparation Step

The same γ-alumina as used in the mixture (a) preparation step was added to the fired product so that the molar ratio (Al/Li) to Li in the α-lithium aluminate (1) became 0.015, and thereafter fully mixed by a Henschel Mixer to thereby prepare a homogeneous mixture (b).

(d): A Second Firing Reaction Step

The homogeneous mixture (b) was charged in an alumina crucible, and subjected to a second firing reaction at 800° C. for 7 hours in the air atmosphere to thereby obtain α-lithium aluminate (2) sample. The obtained α-lithium aluminate (2) sample was subjected to X-ray diffraction analysis, and was α-lithium aluminate single phase, and had a BET specific surface area of 31.2 m²/g.

Comparative Example 1

A θ-alumina having a BET specific surface area of 70 m²/g and an average particle size determined by the laser method of 30 μm, and a lithium carbonate having an average particle size determined by the laser method of 5 μm were weighed and mixed by the same method as in Example 1 to thereby obtain a homogeneous mixture (a).

Then, the homogeneous mixture (a) was charged in an alumina crucible, and fired at 700° C. for 25 hours in the air atmosphere to thereby make α-lithium aluminate sample. The obtained α-lithium aluminate sample was subjected to X-ray diffraction analysis, and was α-lithium aluminate single phase, and had a BET specific surface area of 18.7 m²/g.

Comparative Example 2

A θ-alumina having a BET specific surface area of 70 m²/g and an average particle size determined by the laser-method of 30 μm, and a lithium carbonate having an average particle size determined by the laser method of 5 μm were weighed in such amounts that the molar ratio (Al/Li) became 1.00, and charged in a bead mill and mixed and crushed in a wet state. Then, the obtained slurry was dried as the whole amount by a spray drier to thereby prepare a homogeneous mixture.

Then, the homogeneous mixture was charged in an alumina crucible, and subjected to a firing reaction at 740° C. for 7 hours, and further at 800° C. for 7 hours, in the air atmosphere to thereby obtain a fired product. The obtained fired product was subjected to X-ray diffraction, analysis, and was α-lithium aluminate single phase, and had a BET specific surface area of 20.1 m²/g.

TABLE 1

| | (a); Mixture (a) Preparation Step Alumina Raw Material | | | (c); Mixture (b) Preparation Step |
|---|---|---|---|---|
| | Crystal Form | BET Specific Surface Area (m²/g) | Average Particle Size (μm) | ‡ Loading of Aluminum Compound: Molar Ratio of (Al/Li) |
| Example 1 | θ | 92 | 30 | 0.015 |
| Example 2 | γ | 147 | 30 | 0.015 |
| Comparative Example 1 | θ | 70 | 30 | none |
| Comparative Example 2 | θ | 70 | 30 | none | note)
The loading of the aluminum compound is represented by a molar ratio (Al/Li) of Al in the added aluminum compound to Li in the fired product (α-lithium aluminate (1)).

<Evaluation of Stabilities>

The each α-lithium aluminate sample obtained in the Examples and Comparative Examples was evaluated for thermal stability and evaluated for chemical stability.

<Thermal Stability Test>

10 g of the each α-lithium aluminate sample obtained in the Examples and Comparative Examples was put in an electric furnace in the air atmosphere and heated at 750° C. for 200 hours, and subjected to X-ray diffraction analysis to check the presence/absence of γ-lithium aluminate, X-ray diffraction diagrams after the heat treatment of the α-lithium aluminate samples of Example 1 and Comparative Example 2 are shown in FIG. 5 and FIG. 6, respectively.

<Chemical Stability Test>

The each α-lithium aluminate sample obtained in the Examples and Comparative Examples, and an electrolyte (component composition: $Li_2CO_3$: $K_2CO_3$=53:47 mol %) were mixed in a weight ratio of 1:2 and heated in an electric furnace held in an atmosphere of air/nitrogen/$CO_2$=50/40/10 in volume ratio, at a temperature of 670° C. for 200 hours, and subjected to X-ray diffraction analysis to check the presence/absence of γ-lithium aluminate.

TABLE 2

| | Thermal Stability Test presence/absence of γ Phase | Chemical Stability Test presence/absence of γ Phase |
|---|---|---|
| Example 1 | none | none |
| Example 2 | none | present |
| Comparative Example 1 | present | present |
| Comparative Example 2 | present | present |

From Table 2, it is clear that the α-lithium aluminate obtained by the present production method was excellent in thermal stability. It is also clear that the α-lithium aluminate improved in chemical stability was obtained by using a transition alumina containing a θ phase as a transition alumina of a raw material.

INDUSTRIAL APPLICABILITY

The present invention can provide α-lithium aluminate by an industrially advantageous method, which, even in the case of a fine product having a BET specific surface area of 10 m²/g or larger, is excellent in thermal stability and has various physical properties suitable as an electrolyte matrix for MCFCs.

The invention claimed is:

1. A method for producing α-lithium aluminate, comprising: mixing a transition alumina and lithium carbonate in a molar ratio of Al/Li of 0.95 to 1.01, subjecting the obtained mixture (a) to a first firing reaction to thereby obtain a fired product, and then, subjecting a mixture (b) obtained by adding an aluminum compound in a molar ratio (Al/Li) of Al atoms in the aluminum compound to Li atoms in the obtained fired product of 0.001 to 0.05 to the fired product, to a second firing reaction.

2. The method for producing α-lithium aluminate according to claim 1, wherein the first firing reaction uses a firing temperature of 650 to 850° C.

3. The method for producing α-lithium aluminate according to claim 1, wherein the second firing reaction uses a firing temperature of 750 to 900° C.

4. The method for producing α-lithium aluminate according to claim 1, wherein the transition alumina is a transition alumina containing a θ phase or γ-alumina.

5. The method for producing α-lithium aluminate according to claim 1 wherein the transition alumina is θ-alumina.

6. The method for producing α-lithium aluminate according to claim 1, wherein the transition alumina has a BET specific surface area of 50 m²/g or larger.

7. The method for producing α-lithium aluminate according to claim 1, wherein the aluminum compound is a transition alumina.

8. The method for producing α-lithium aluminate according to claim 1, wherein the α-lithium aluminate is used as an electrolyte matrix for molten carbonate fuel cells.

* * * * *